(12) United States Patent
Lambert et al.

(10) Patent No.: US 9,784,860 B2
(45) Date of Patent: *Oct. 10, 2017

(54) SEISMIC SYSTEM WITH GHOST AND MOTION REJECTION

(71) Applicant: ION Geophysical Corporation, Houston, TX (US)

(72) Inventors: Dale J. Lambert, Mandeville, LA (US); Andre' W. Olivier, River Ridge, LA (US); Robert E. Rouquette, Covington, LA (US)

(73) Assignee: Ion Geophysical Corporation, Houston, TX (US)

( * ) Notice: Subject to any disclaimer, the term of this patent is extended or adjusted under 35 U.S.C. 154(b) by 423 days.

This patent is subject to a terminal disclaimer.

(21) Appl. No.: 14/275,497

(22) Filed: May 12, 2014

(65) Prior Publication Data

US 2014/0328138 A1 Nov. 6, 2014

Related U.S. Application Data

(63) Continuation of application No. 13/011,358, filed on Jan. 21, 2011, now Pat. No. 8,730,766.

(60) Provisional application No. 61/297,656, filed on Jan. 22, 2010.

(51) Int. Cl.
*G01V 1/18* (2006.01)
*G01V 1/36* (2006.01)
*G01V 1/38* (2006.01)

(52) U.S. Cl.
CPC .............. *G01V 1/18* (2013.01); *G01V 1/189* (2013.01); *G01V 1/36* (2013.01); *G01V 1/38* (2013.01); *G01V 2210/56* (2013.01)

(58) Field of Classification Search
CPC ................... G01V 1/18; G01V 1/189
See application file for complete search history.

(56) References Cited

U.S. PATENT DOCUMENTS

| | | | |
|---|---|---|---|
| 3,283,293 A | 11/1966 | Pavey, Jr. et al. | |
| 3,290,645 A | 12/1966 | Pavey, Jr. et al. | |
| 3,299,397 A | 1/1967 | Pavey, Jr. et al. | |
| 3,860,899 A * | 1/1975 | Watlington | G01S 1/72 367/130 |

(Continued)

FOREIGN PATENT DOCUMENTS

| | | |
|---|---|---|
| RU | 2136019 C1 | 8/1999 |
| WO | 2007149702 A2 | 12/2007 |

OTHER PUBLICATIONS

International Search Report and Written Opinion of the ISA/EP in International Patent Application PCT/US2011/022059, mailing date Jul. 13, 2012, European Patent Office, Rijswijk, NL.

*Primary Examiner* — Hovhannes Baghdasaryan
(74) *Attorney, Agent, or Firm* — James T. Cronvich

(57) ABSTRACT

An underwater seismic system for reducing noise due to ghost reflections or motion through the water from seismic signals. The system includes two motion sensors. One sensor has a first response and is sensitive to platform-motion-induced noise as well as to acoustic waves. The other sensor has a different construction that isolates it from the acoustic waves so that its response is mainly to motion noise. The outputs of the two sensor responses are combined to remove the effects of motion noise. When further combined with a hydrophone signal, noise due to ghost reflections is reduced.

19 Claims, 8 Drawing Sheets

(56) References Cited

U.S. PATENT DOCUMENTS

| | | | |
|---|---|---|---|
| 3,911,388 A * | 10/1975 | Crump | G01V 1/16 |
| | | | 310/329 |
| 4,135,141 A * | 1/1979 | Caldwell | G01V 1/201 |
| | | | 114/245 |
| 4,345,473 A | 8/1982 | Berni | |
| 4,437,175 A | 3/1984 | Berni | |
| 4,477,887 A | 10/1984 | Berni | |
| 4,486,865 A | 12/1984 | Ruehle | |
| 4,520,467 A | 5/1985 | Berni | |
| 4,821,241 A | 4/1989 | Berglund | |
| 4,935,903 A | 6/1990 | Sanders et al. | |
| 4,979,150 A | 12/1990 | Barr | |
| 5,251,181 A | 10/1993 | Toda | |
| 5,265,066 A * | 11/1993 | Svenning | G01V 1/3808 |
| | | | 367/154 |
| 5,621,699 A | 4/1997 | Rigsby et al. | |
| 5,621,700 A | 4/1997 | Moldoveanu | |
| 6,172,940 B1 * | 1/2001 | McConnell | G01H 3/12 |
| | | | 181/122 |
| 6,205,403 B1 * | 3/2001 | Gaiser | G01V 1/16 |
| | | | 702/14 |
| 6,512,980 B1 * | 1/2003 | Barr | G01V 1/3808 |
| | | | 367/159 |
| 6,775,618 B1 | 8/2004 | Robertson et al. | |
| 7,167,413 B1 | 1/2007 | Rouquette | |
| 7,239,577 B2 | 7/2007 | Tenghamn et al. | |
| 7,298,672 B1 | 11/2007 | Tenghamn et al. | |
| 7,359,283 B2 | 4/2008 | Vaage et al. | |
| 7,379,386 B2 | 5/2008 | Muyzert et al. | |
| 7,460,434 B2 | 12/2008 | Stenzel et al. | |
| 7,466,625 B2 | 12/2008 | Robertson et al. | |
| 7,468,932 B2 | 12/2008 | Tenghamn | |
| 7,548,486 B2 | 6/2009 | Tenghamn | |
| 7,623,414 B2 | 11/2009 | Boergen et al. | |
| 7,926,614 B2 | 4/2011 | Tenghamn et al. | |
| 8,243,547 B2 * | 8/2012 | Stewart | G01V 1/364 |
| | | | 367/24 |
| 2004/0042341 A1 * | 3/2004 | Tenghamn | G01V 1/181 |
| | | | 367/15 |
| 2005/0194201 A1 | 9/2005 | Tenghamn et al. | |
| 2006/0133202 A1 | 6/2006 | Tenghamn | |
| 2006/0193203 A1 | 8/2006 | Tenghamn et al. | |
| 2006/0215490 A1 | 9/2006 | Tenghamn et al. | |
| 2006/0239117 A1 | 10/2006 | Singh et al. | |
| 2007/0064528 A1 * | 3/2007 | Metzbower | G01V 1/201 |
| | | | 367/20 |
| 2008/0072671 A1 * | 3/2008 | Eller | G01P 15/0915 |
| | | | 73/514.34 |
| 2008/0219095 A1 | 9/2008 | Perciot et al. | |
| 2008/0253226 A1 | 10/2008 | Tenghamn et al. | |
| 2009/0040872 A1 | 2/2009 | Pabon et al. | |
| 2009/0065289 A1 | 3/2009 | Tenghamn et al. | |
| 2009/0122641 A1 * | 5/2009 | Hillesund | G01V 1/3808 |
| | | | 367/20 |
| 2009/0161487 A1 | 6/2009 | Kjellgren et al. | |
| 2009/0296521 A1 | 12/2009 | Perciot et al. | |
| 2009/0296529 A1 | 12/2009 | Boergen et al. | |
| 2010/0039889 A1 | 2/2010 | Teigen et al. | |
| 2010/0039890 A1 | 2/2010 | Tustin et al. | |
| 2010/0124149 A1 | 5/2010 | Barr, Jr. | |
| 2010/0165792 A1 | 7/2010 | Stenzel et al. | |
| 2010/0202249 A1 | 8/2010 | Goujon et al. | |
| 2010/0202251 A1 | 8/2010 | Ozdemir et al. | |
| 2011/0044129 A1 | 2/2011 | Traetten et al. | |
| 2011/0176385 A1 | 7/2011 | Lambert | |
| 2011/0273957 A1 | 11/2011 | Guizelin et al. | |

* cited by examiner

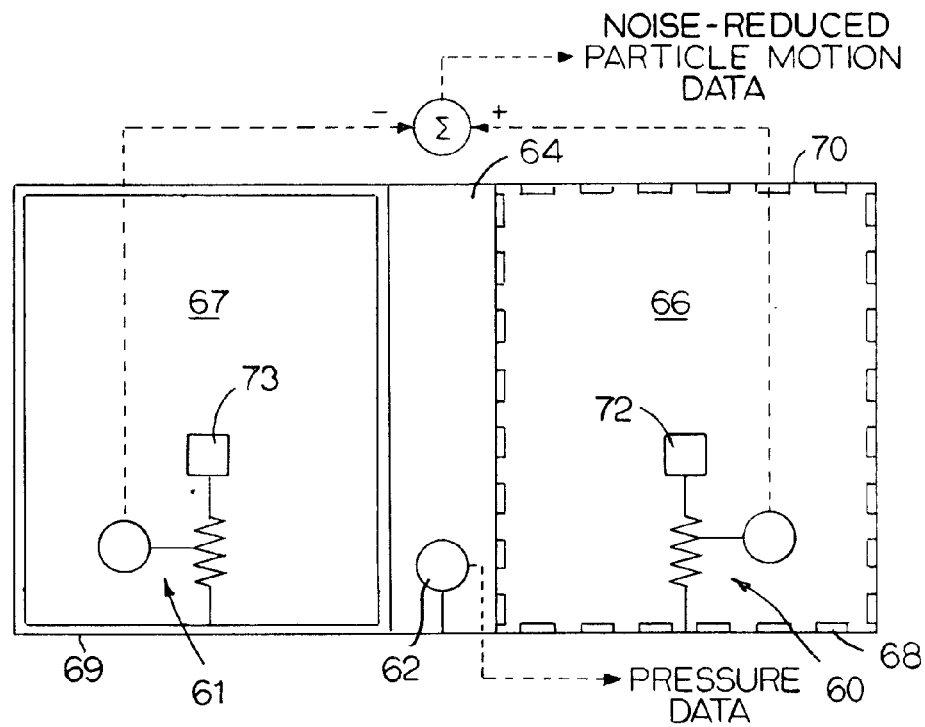
FIG. 13
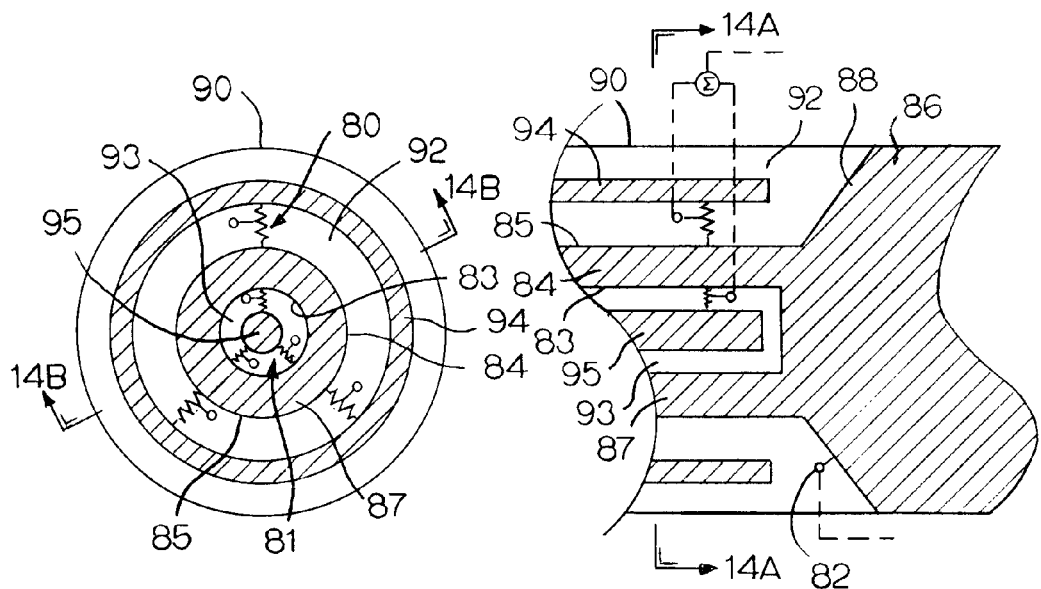
FIG. 14A
FIG. 14B

SEISMIC SYSTEM WITH GHOST AND MOTION REJECTION

CROSS-REFERENCE TO RELATED APPLICATIONS

This application is a continuation of co-pending U.S. patent application Ser. No. 13/011,358, filed Jan. 21, 2011, which claims priority to U.S. Provisional Patent Application No. 61/297,656, filed Jan. 22, 2010. Both prior applications are incorporated entirely by reference into this specification.

BACKGROUND

The invention relates generally to marine seismic prospecting and in particular to apparatus and methods for reducing the effects of undesired seismic reflections and noise in sensors towed behind a survey vessel, in sensors laid on the sea bottom, or in sensors in autonomous nodes.

In towed marine seismic exploration, a hydrophone array is towed behind a marine vessel 20 near the sea surface 22, as in FIG. 1. The hydrophones are mounted in multiple sensor cables commonly referred to as streamers 24. The streamers serve as platforms for the hydrophones. A seismic sound source 26, also towed near the sea surface, periodically emits acoustic energy. This acoustic energy travels downward through the sea, reflects off underlying structures or subsea strata 28, and returns upward through the sea to the hydrophone array. Reflected seismic energy arrives at towed-array receive points. The hydrophone array contains many such receive points and records the upward traveling seismic acoustic wavelet from the seabed 30 at each of the receive points. The hydrophone recordings are later processed into seismic images of the underlying structures.

Noise is a major consideration in towed streamer operations. Noise sources include swell noise and wave noise from the sea surface. And towing the streamer through the water causes noise. Some of this noise propagates through the streamer and some through the water column itself. The typical way of dealing with noise sources is to use a combination of temporal and spatial filtering. Temporal filtering is accomplished by discrete digital sampling of the hydrophone signals in time with weighting applied to the samples. The hydrophone channels also include analog filters to prevent aliasing of signals at frequencies greater than half the sample rate. The spatial samples are typically formed by group-summing individual hydrophone outputs so that pressure noise propagating along the length of the streamer is attenuated. This spatial sampling has no impact on noise that propagates in a direction orthogonal to the streamer axis. Typical hydrophone groups consist of eight or so hydrophones in a 12 m section of the streamer.

Acoustic impedance, $\rho c$, is the product of the density and the speed of sound in a medium. Reflection of at least some of the sound-wave energy occurs whenever a change in acoustic impedance is encountered by the sound waves. The energy that is not reflected is transmitted (refracted) beyond the boundary between the two regions of different acoustic impedances. The pressure waves are compression waves, which induce particle motion in the direction of propagation. At a planar interface between two different homogenous media, a sound wave reflects at an angle equal to the angle of incidence $\theta_1$ and refracts at an angle $\theta_2$. The refraction angle is given by:

$$\theta_2 = \sin^{-1}(c_2 \sin \theta_1 / c_1).$$

The subscript refers to the sound wave moving from medium 1 to medium 2 and $c_1$ and $c_2$ are the speeds of sound in each medium. If the incident angle $\theta_1$ is zero, then the refracted energy propagation path will be at an angle $\theta_2$ of zero.

For an incident angle $\theta_1$ of zero and no energy converted to shear energy, the reflection coefficient at the water-air interface is described by:

$$R_{pp} = \frac{\rho_2 c_2 - \rho_1 c_1}{\rho_2 c_2 + \rho_1 c_1}$$

$$\approx -1.$$

The reflected energy at the water-air interface is $R^2_{pp}$, or nearly 1, making the sea surface a near perfect reflector of sound energy. After returning from the sea bottom or the target of interest, the energy is again reflected by the sea surface back to the streamer. Because a typical hydrophone has an omni-directional response, the hydrophone array also records a ghost response, which is the seismic acoustic wavelet reflected from the sea surface and arriving delayed in time and reversed in polarity. The ghost is a downward-traveling seismic acoustic wave that, when added to the desired wave, detracts from the recorded seismic image. The ghost-causing reflection can also continue to the sea bottom or other strong reflector and be reflected back up to again interfere with the desired reflections and further degrade the image. These reflections are commonly referred to as multiples.

For a vertically traveling pressure wave, the ghost produces a notch in the frequency spectrum of a hydrophone response at $f_{notch} = c/2d$, where c is the speed of sound and d is the streamer depth. Seismic streamers have been conventionally towed at a depth of 10 m or less. At a depth of 10 m, the notch frequency ($f_{notch}$) is 75 Hz. A frequency response extending beyond 100 Hz is required for high seismic image resolution. Because the notch frequency is inversely proportional to the tow depth, streamers are often towed at shallower depths to improve the resolution of a seismic image. Towing at shallow depths is problematic because noise from the sea surface begins to interfere with the desired seismic signals. These effects are worsened as weather deteriorates, sometimes causing the crew to discontinue operations until the weather improves. The elimination of ghost-notch effects would enable towing at greater depths farther away from surface disturbances.

Ocean bottom systems, in which the seismic sensors are placed on the seabed, reject ghosts and multiples by a technique commonly known as p-z summation. In an acoustic wave, the pressure p is a scalar, and the particle velocity u is a vector. A hydrophone, with a positive omni-directional response, records the seismic acoustic wave pressure p. A vertically oriented geophone or accelerometer records the vertical component of the seismic acoustic-wave particle velocity $u_z$, with a positive response to up-going signals and a negative response to down-going signals. In p-z summation, the velocity signal is scaled by the acoustic impedance $\rho c$ of seawater before it is added to the pressure signal. A gimbaled single-axis sensor is also scaled to account for the change in sensitivity of the particle-motion sensor due to the off-axis arrival of any received signals. If an accelerometer is used, its output signal can be integrated to obtain the velocity signal, or the hydrophone signal can be differentiated so that it can better spectrally match the accelerometer. This produces a compound sensor that has a full response to the upward traveling wave and at least a partially muted response to the downward traveling wave to reject the ghost and multiples. One such method of signal conditioning and combination of signals to get a single de-ghosted trace is described in U.S. Pat. No. 6,539,308 to Monk et al. FIG. 2 is a two-dimensional (2D) representation of the response of a particle-velocity sensor. FIG. 3 is a 2D representation of the response of an omni-directional hydrophone summed with the response of a vertical particle-motion sensor. The full three-dimensional responses can be envisioned by rotating the 2D responses about their vertical axes.

Recently there has been interest in using techniques similar to p-z summation in towed-streamer acquisition to allow deeper tows without interference from ghost-notch reflections. Operating a particle-motion sensor in a seismic streamer presents a problem because the streamer experiences accelerations due to towing or sea surface effects that are large compared to accelerations caused by the desired seismic reflections. Moreover, these unwanted accelerations are in the same spectral band as the desired reflection response. When a towing vessel encounters ocean waves, there are small perturbations in the speed of the vessel. The vessel also typically undergoes a yawing motion. FIG. 4 depicts energy being imparted to the streamers 24 by speed variations 32 and yawing motion 34. FIG. 5 is a side view depicting energy causing accelerations and transverse waves in the streamer 24. (The energy's effect on the streamer is exaggerated in FIG. 5 for illustrative purposes.) Most of the energy is attenuated by elastic stretch members 36, typically in front of the sensing arrays. While the energy is greatly attenuated, some does remain. Accelerations a caused by planar pressure waves due to the desired seismic reflections are given by:

$$a = \frac{p 2\pi f}{Z},$$

where p=the acoustic sound pressure level, f is the frequency, and Z is the acoustic impedance. Performance of a particle-velocity measuring system should be near the ambient noise limits. Typically, seismic-data customers require ambient noise from streamer hydrophone systems to be below 3 µbar. Since the acoustic impedance of seawater is 1.5 MPa·s/m, a 3 µbar pressure wave at 4 Hz produces particle accelerations of roughly 0.5 µg. FIG. 6 shows a mechanical model of the frequency response of typical cable axial accelerations in the middle of a streamer. The presence of a secondary peak at 4 Hz, only 1.5 orders of magnitude below the primary peak, indicates that, in some cases, the cable dynamic motion can be greater than the seismic signal to be measured.

U.S. Pat. No. 7,167,413 to Rouquette uses an accelerometer in a seismic streamer to reject the ghost-notch effect. Rouquette uses a mass-spring system to reduce the effect of cable dynamics on the accelerometer and a load-cell system to measure and reject the cable-motion-induced noise on the accelerometer. The Rouquette system relies on well-known complex mechanical relationships that do not remain constant with manufacturing tolerances, aging, and environmental conditions. Rouquette uses a signal-processing adaptive algorithm to derive the relationship of the load-cell-sensor-and-mass-spring system to the acceleration acting on the accelerometer in situ. Rouquette describes a complex mechanical and electronic system.

U.S. Pat. No. 7,239,577 to Tenghamn et al. describes an apparatus and method for rejecting the ghost notch using an acoustic-wave particle-velocity sensor. Tenghamn et al. teaches the use of a fluid-damped, gimbaled geophone. It is known in the art that the fluid encapsulating the geophone is chosen to provide damping of the sensor swinging on its gimbals. While not described in Tenghamn et al., it is known in the art that a mass-spring vibration-isolation system can reduce the effect of cable mechanical motion on the geophone response. Motion of the geophone caused by cable mechanical motion is indistinguishable from acoustic-wave particle motion in the geophone response. The desired seismic-wave particle motion is obscured by cable mechanical motion in Tenghamn et al. This technique also gives the response similar to the cardioid in FIG. 3, where there are still undesired signals coming from the surface and being induced by streamer excitation along the streamer axis.

U.S. Pat. No. 7,359,283 to Vaage et al. describes a method of combining pressure sensors and particle-motion sensors to address the impact of mechanical motion on the particle-motion sensors. In this method, the response of the particle-motion sensor below a certain frequency $f_0$ is not used, but only estimated from the pressure-sensor response and the known pressure-sensor depth. The frequencies rejected are those for which mechanical motion of the streamer is expected. The estimated response has poor signal-to-noise ratio at the lower frequencies of interest. This rejection below a certain frequency is not optimal as it also rejects valid signals in an important low-frequency band where deep-target data is likely to exist.

While these patents all describe methods to reject the ghost notch in a seismic streamer, none adequately addresses the effects of streamer tow and other noise that affects the particle-motion sensor or hydrophone measurements. All also fall short of producing high-fidelity, sensed acoustic-wave components with good signal-to-noise ratio down to the lowest frequencies of interest.

SUMMARY

These shortcomings are addressed by an underwater seismic system embodying features of the invention. Such a system comprises a first motion sensor that can be used on an underwater platform and has a first response and a second motion sensor that is disposed proximate to the first motion sensor and has a second response. The first and second responses are similar in magnitude for platform motion and different for acoustic wave particle motion.

One version comprises a first motion sensor having a first acoustic impedance to produce a first sensor signal representing platform motion and acoustic waves and a second motion sensor disposed proximate to the first motion sensor and having a second acoustic impedance to produce a second sensor signal representing platform motion and representing attenuated particle motion due to acoustic waves. Means for combining the first sensor signal and the second sensor signal attenuates noise due to platform motion and produces a response to particle motion due to acoustic waves.

Yet another version comprises a first motion sensor and a second motion sensor disposed proximate to the first motion sensor. An acoustic shield is arranged to shield only the second motion sensor from acoustic wave particle motion.

BRIEF DESCRIPTION OF THE DRAWINGS

These aspects and features of the invention are better understood by referring to the following description, appended claims, and accompanying drawings, in which:

FIG. 13 is one version of a seismic system as in FIG. 7 in which the motion sensors are housed in different structures, which provide different acoustic impedances;

FIGS. 14A and 14B are cross-sectional views of another seismic system as in FIG. 7 having multiple motion sensors axisymmetrically arranged in a streamer;

DETAILED DESCRIPTION

Figure 1:
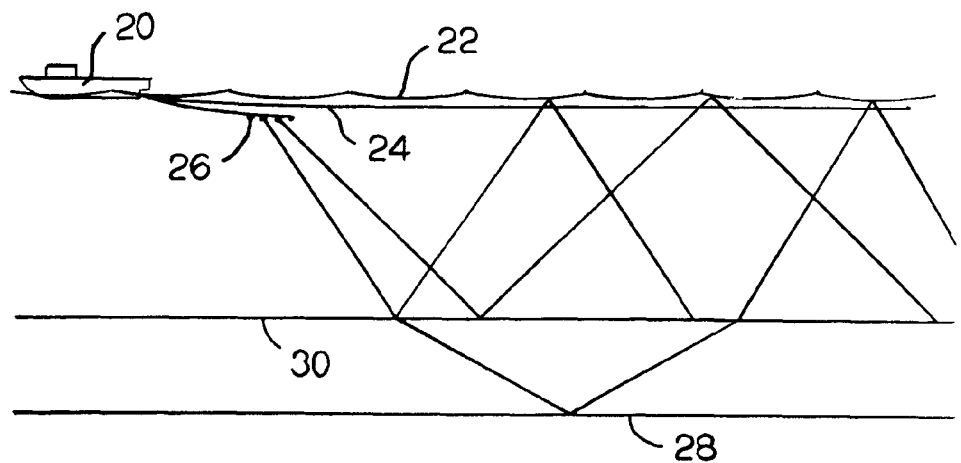
FIG. 1 is a side elevation view of a typical seismic survey operation showing an array of hydrophones under tow behind a survey vessel and depicting reflected seismic energy arriving at towed-array receive points.
Figure 2:
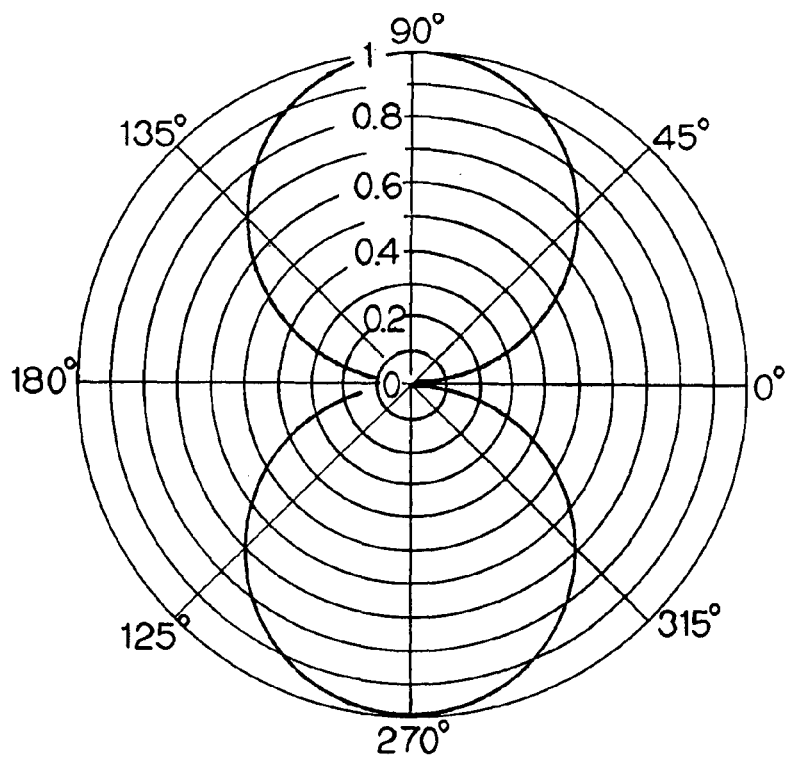
FIG. 2 is a two-dimensional graph of the response of a particle-velocity sensor.
Figure 3:
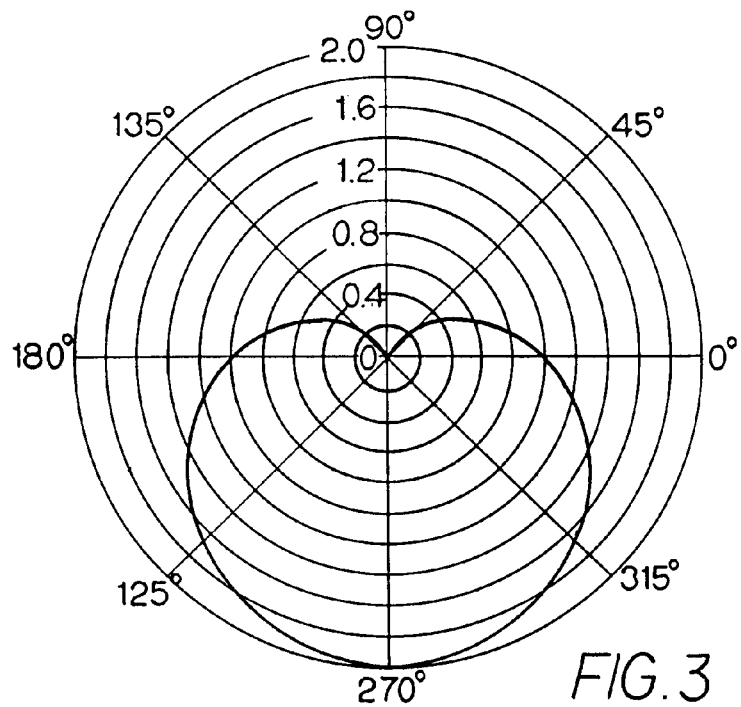
FIG. 3 is a two-dimensional graph of the response of an omni-directional hydrophone summed with the response of a vertical particle-velocity sensor.
Figure 4:
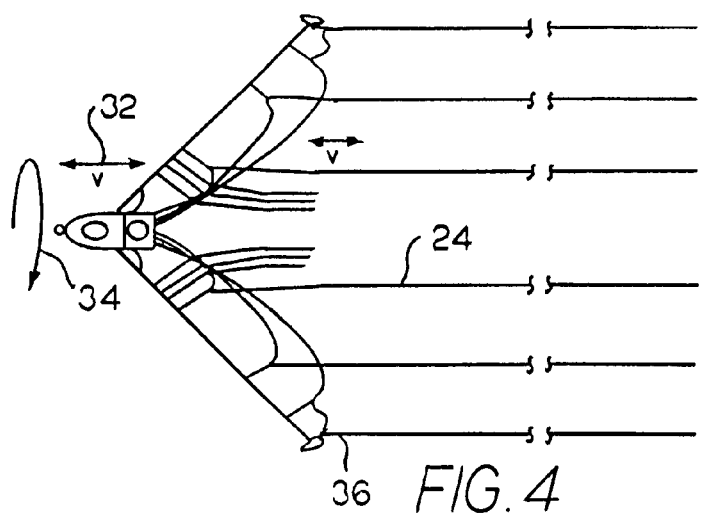
FIG. 4 is a top plan view of a typical survey as in FIG. 1 depicting tow-speed fluctuations and yaw.
Figure 5:
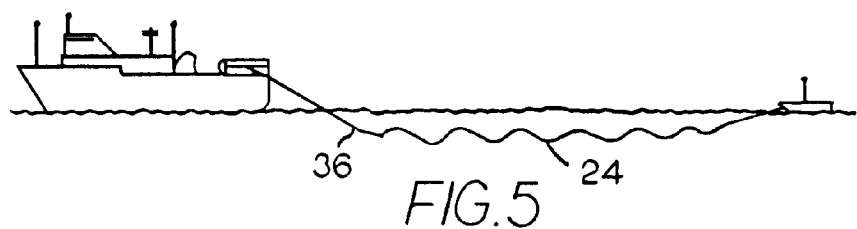
FIG. 5 is a side elevation view of a survey as in FIG. 4 depicting the exaggerated effects of tow-speed fluctuations and yaw on streamer shape.
Figure 6:
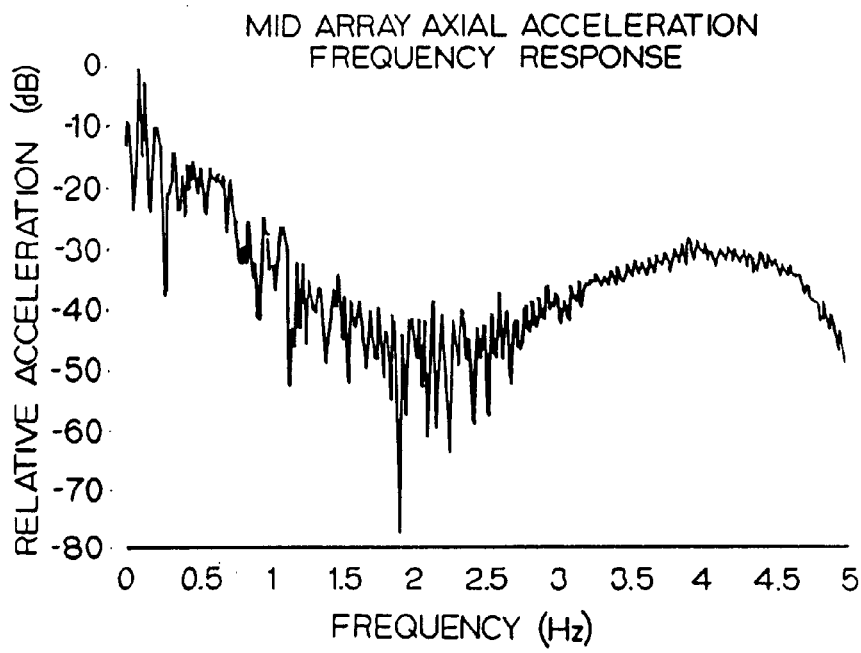
FIG. 6 is a plot of typical accelerations of a streamer in a survey as in FIG. 1.
Figure 7:
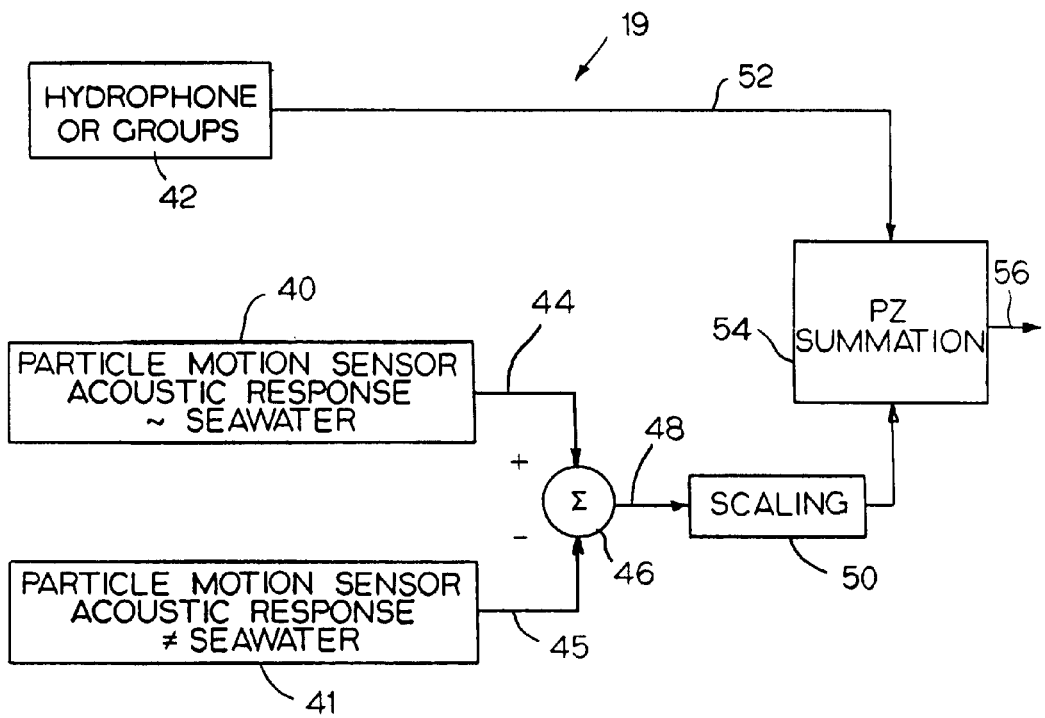
FIG. 7 is a block diagram of a general version of an underwater seismic system embodying features of the invention including two motion sensors with different acoustic responses.

FIG. 7 is a block diagram of a general version of an underwater seismic system 19 embodying features of the invention, which comprises techniques for using motion sensors, or sensor assemblies, with different responses to sound-wave-induced signals and similar responses to platform, e.g., streamer, cable, or autonomous node, motion to improve the signal-to-noise ratio of data acquired for seismic imaging. In FIG. 7, two motion sensors 40, 41 and one pressure sensor 42, generally a hydrophone, provide signals that are combined to produce a noise-reduced and de-ghosted signal. A group of pressure sensors can be used in lieu of a single sensor, e.g., to reduce the noise arising from pressure waves propagating along the streamer axis. The motion sensors ideally are dc-sensitive and are capable of resolving the gravity vector; otherwise, an additional orientation sensor is used. The first motion sensor 40 has a response to acoustic waves that is ideally, but not necessarily, equal to that of seawater; its response may be increased beyond that of seawater if more gain is desired. The second motion sensor 41 has a response to acoustic waves that is measurably different from that of the first motion sensor 40. This difference in acoustic response can be realized by means of a difference in the material composition or the geometric configuration of the sensors. In all versions of the system, the material and geometric properties of both sensors are chosen so that their mechanical responses to platform motion are matched. For example, if each motion sensor is designed to interact with a cable in the same way as a second-order mass-spring system, then the masses (including added mass, if appropriate) of the sensors and their associated spring constants are made equal. The first and second outputs 44, 45 of the first and second motion sensors 40, 41 are subtracted 46, either locally or after remote processing, to produce a reduced-noise response signal 48 indicating particle motion due to acoustic waves with platform motion attenuated. The subtraction block 46 constitutes one means for combining the first sensor signal and the second sensor signal. If the signal of one of the sensors is reversed in phase, the means for combining the first sensor signal and the second sensor signal would be realized as an addition block instead. The reduced-noise response is scaled 50 to match the pressure-sensor response 52, e.g., the hydrophone signal, and used in p-z summation means 54 to produce a final output signal 56 that also rejects ghost notches and multiples. The means for combining the first sensor signal and the second sensor signal and the p-z summation means may be realized locally by analog circuitry, by digital logic circuitry, or algorithmically in a microprocessor, remotely in a shipboard computer or in off-line data processing.

Figures 8, 9:
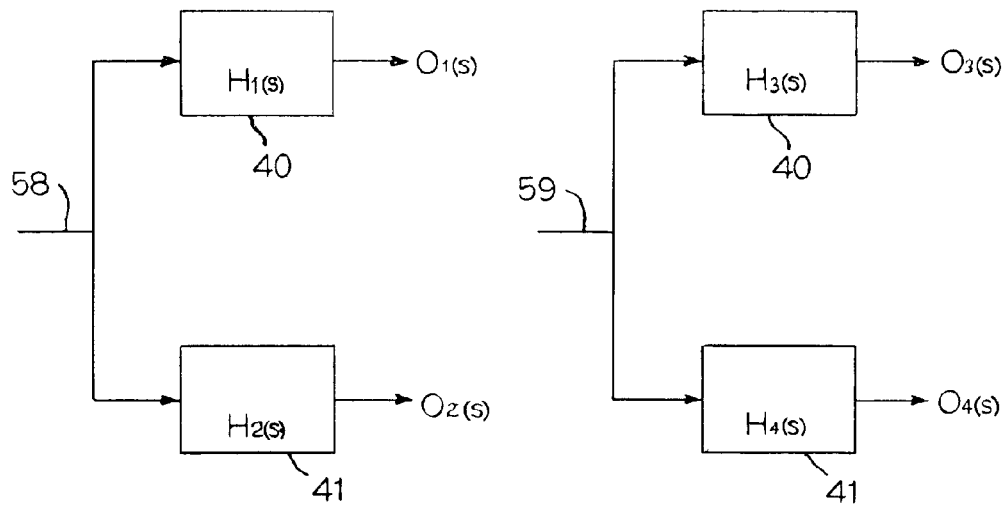
FIG. 8 is a frequency-domain block diagram of the responses of motion sensors as in FIG. 7 to the acoustic-wave component of incident acoustic energy.
FIG. 9 is a frequency-domain block diagram of the responses of motion sensors as in FIG. 7 to the platform-motion component of incident acoustic energy.
Figure 10:
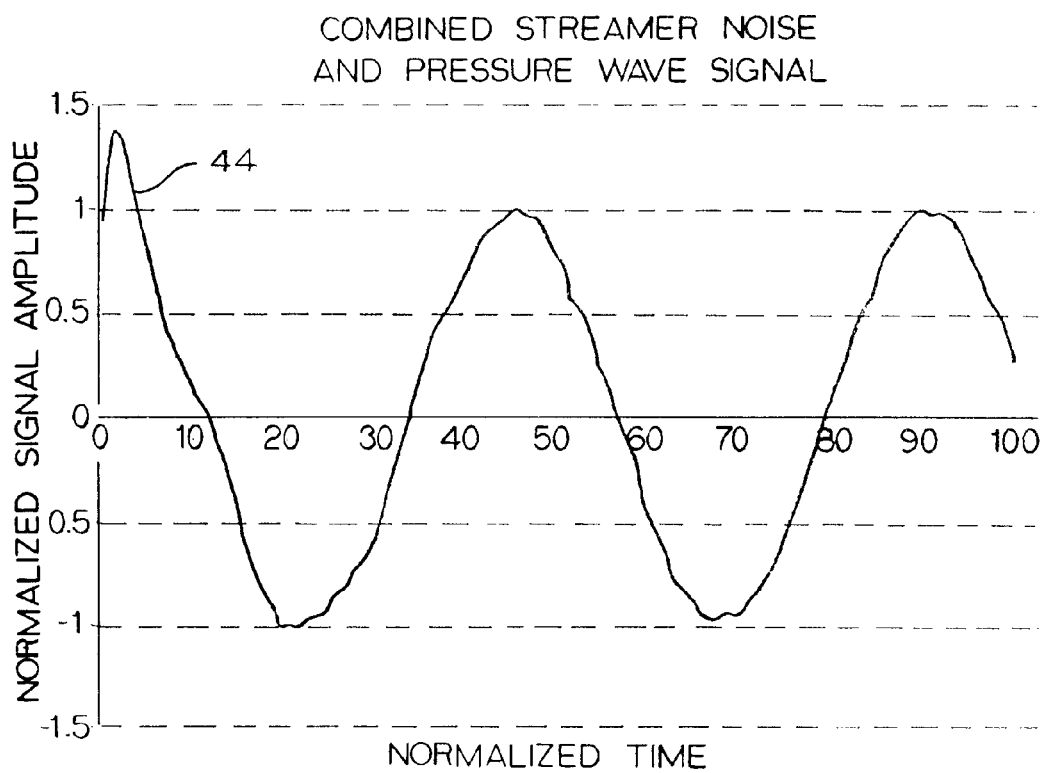
FIG. 10 is a time-domain plot of the output of a motion sensor as in FIG. 7 that is responsive to platform motion and acoustic (pressure) waves.
Figure 11:
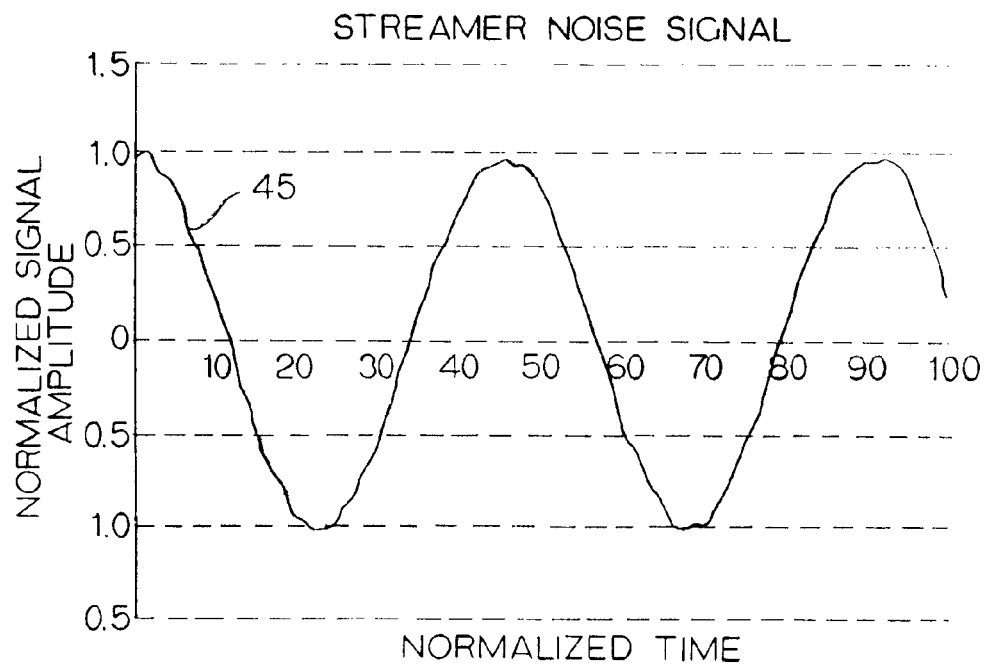
FIG. 11 is a time-domain plot of the output of a motion sensor as in FIG. 7 that is responsive only to platform motion.
Figure 12:
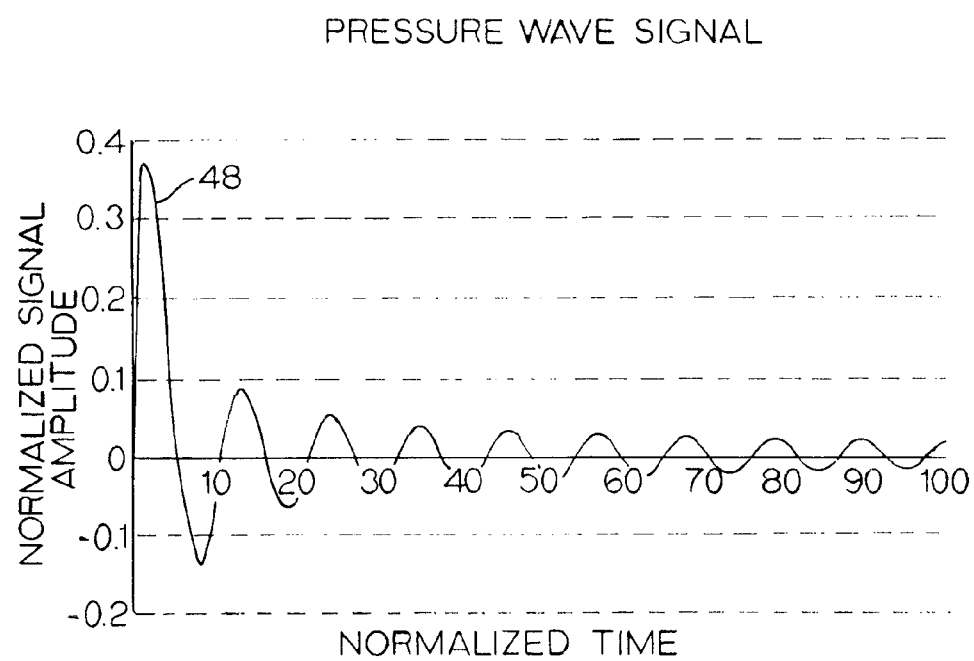
FIG. 12 is a plot of the difference between the outputs of FIGS. 10 and 11 representing an acoustic (pressure) wave signal with platform motion removed.

FIG. 8 is a block diagram of the two motion sensors 40, 41 of FIG. 7 in the frequency domain indicating their transfer functions to the acoustic wave component 58 of incident energy. The acoustic wave component includes the seismic signals of interest. The first sensor 40 and the second sensor 41 have unequal acoustic wave transfer functions $H_1(s)$ and $H_2(s)$. The transfer function $H_1(s)$ is sensitive to acoustic wave particle motion, so that the first sensor 40 produces an output response $O_1(s)$ that represents particle motion. The transfer function $H_2(s)$ is insensitive to acoustic wave particle motion, and the second sensor 41 produces an output response $O_2(s)$ that does not include the motion of surrounding acoustic-medium particles. FIG. 9 is a block diagram of the two motion sensors 40, 41 of FIG. 7 in the frequency domain indicating their transfer functions to the platform-motion component 59 of incident energy. The transfer functions $H_3(s)$ and $H_4(s)$ of the two motion sensors 40, 41 to platform motion are proportional (or equal) in magnitude, but could be opposite in phase. Thus, both sensors 40, 41 have similar output responses $O_3(s)$ and $O_4(s)$ to platform motion. The composite transfer functions of the first and second motion sensors 40, 41 to incident energy are the combinations of $H_1(s)$ and $H_3(s)$ for the first sensor and of $H_2(s)$ and $H_4(s)$ for the second sensor. The composite responses of the two sensors are the combinations of $O_1(s)$ and $O_3(s)$ for the first motion sensor and of $O_2(s)$ and $O_4(s)$ for the second motion sensor. FIG. 10 is an example representation of the time-domain response of the first sensor 40 to incident energy that includes both platform motion and acoustic waves. The first sensor's response 44 is sensitive to both platform noise and the acoustic wave. FIG. 11 is the corresponding response of the second sensor 41 to the same incident energy. The second sensor's response 45 is sensitive only to the platform-noise component of the incident energy. FIG. 12 plots the result of combining the responses of the two sensors by subtracting the output 45 of the second sensor from the output 44 of the first sensor to produce the noise-subtracted acoustic wave signal 48 of FIG. 7. Although, for purposes of simplifying the description, the response of the second sensor to pressure waves was treated as zero, it may have some slight response, or even a negative response, to pressure waves. Furthermore, the first and second sensor outputs may not be exactly matched to streamer vibrations. But, even in these instances, the signal subtraction still results in an acoustic wave response with a greatly attenuated platform-motion response that can be scaled and combined with the hydrophone data by p-z summation.

Various specific versions of the general system indicated in the block diagrams of FIGS. 7-9 use different levels of acoustic impedance to achieve the desired difference in response to acoustic wavelets. As described above, the two motion sensors 40, 41 and the pressure sensor 42 are mounted in, on, or to a platform. For example, they may be enclosed in an underwater streamer or mounted inside a cable-positioning bird attached to a streamer. The motion sensors are isolated acoustically from each other, but are located close together and separated into individual regions by a divider, for instance. The first motion sensor is enclosed in a first region with an exterior whose acoustic impedance is similar to that of the surrounding seawater so that acoustic waves penetrate the exterior with minimal reflections and act on the sensor. The second motion sensor is located in an acoustically opaque enclosure in a second region and is not affected by incident acoustic waves. The streamer itself, being under tension, has a small and erratic response to the acoustic waves. Any response of the streamer itself to the acoustic waves is recorded as platform motion. Therefore, the first sensor has a proportional response to acoustic waves; and the second sensor has a negligible response. Additionally, the sensor assemblies are calibrated to have matched responses to platform motions, (e.g., streamer vibrations), for instance by equating their masses (including added mass, if appropriate) and associated spring constants if they behave as second-order mass-spring systems. Subtraction, either locally or after remote processing, of the second sensor signal from the first sensor signal accordingly yields the desired acoustic wave signal with greatly attenuated streamer-motion response.

One specific version of the seismic system of FIGS. 7-9 is shown in FIG. 13 with two motion sensors 60, 61—separated acoustically by a central divider 64—and a pressure sensor 62. The first motion sensor 60 is contained in a first region 66 of the streamer with a rigid, acoustically transparent exterior 68. For example, the exterior 68 is a perforated, rigid housing covered with a flexible, acoustically transparent skin 70. The interior of the first region 66 is filled with fluid. Ideally, the skin and fluid both have acoustic impedances equal to that of the surrounding seawater. A first test mass 72 with an acoustic response ideally, but not necessarily, equal to that of the fluid is suspended in the fluid; its response may be increased beyond that of seawater if more gain is desired. The first test mass 72 is connected to the exterior of the streamer by means of a displacement, velocity, or acceleration sensor, which serves as the motion sensor. The first sensor 60 uses the exterior of the streamer as a frame of reference and acts as a spring in coupling the test mass and streamer dynamically. The first sensor can be single crystal or a PZT bender, for instance. If the sensor is a single-axis sensor, multiple test-mass systems can be used to form a tri-axis sensor, with all test masses calibrated to match in both acoustic and dynamic response. An alternative for multi-axis measurement is to connect several sensors to a common test mass for multi-axis measurement as long as the mass sensor responses can be kept independent. The second sensor 61 and a second test mass 73 are connected in an assembly in a second region 67 on the opposite side of the divider from the first region 66. The second sensor's assembly differs from the first sensor's in that its housing exterior 69 has an acoustic impedance much greater than that of the surrounding seawater and its interior 67 is filled with air to account for any non-negligible elasticity in the housing exterior 69. Augmenting the effects of the increased acoustic impedance of the second sensor's housing is its rigidity, which allows the housing to act as an acoustic shield, analogous to a Faraday cage in electromagnetism. The acoustic impedance of the second housing exterior 69 is set with a material having a suitably high density or sound speed.

Another version of a seismic system embodying the invention is shown in FIGS. 14A and 14B with two sets 80, 81 of motion sensors and a pressure sensor 82. In this version, the first sensor set 80 and the second sensor set 81 are connected to a single rigid body 84 that carries streamer vibrations. The rigid body has a large-diameter first portion 86, a smaller-diameter second portion 87, and a transition section 88 joining the first and second portions. The smaller-diameter portion 87 is tubular in shape with an inner side 83 and an outer side 85. The first sensor set 80 encircles a section of the second portion 87 of the rigid body 84 and is connected to its outer side 85. Three or more individual sensors may be used to constitute the first set 80. If axisymmetry is not employed, then the first sensor set 80 is instead located alongside the rigid body. An acoustically transparent exterior 90, which may consist of a flexible membrane over a perforated, rigid housing, separates the sensor system from the surrounding seawater. A first cavity 92, between the second portion 87 of the rigid body 84 and the exterior 90, is filled with fluid. Ideally, the exterior 90 and the fluid have acoustic impedances equal to the acoustic impedance of the surrounding seawater. A first test mass 94, with acoustic properties like those of the first test mass in FIG. 13, is suspended in the first cavity 92 and encircles the second portion 87 of the rigid body 84. The first test mass 94 is coupled mechanically to the outer side 85 of the rigid body 84 by the first set 80 of motion sensors with properties like those of the first sensor 60 in the version of FIG. 13, but with the rigid body 84 as their frame of reference. A second cavity 93 is contained entirely within the tubular second portion 87 of the rigid body 84. The second cavity 93 contains a second test mass 95 suspended in fluid and coupled to the rigid body 84 by the second set 81 of motion sensors connected to the inner side 83 of the rigid body. The dynamic response of the second set 81 of sensors is calibrated to have a response to streamer vibrations that matches the response of the first set 80. Unlike the first test mass 94, however, no requirements are placed on the acoustic response of the second test mass 95. The rigid body 84 itself acts as an acoustic shield to the second sensor set 81 and is composed of a material with relatively high acoustic impedance. A benefit of this coaxial arrangement is that multiple individual sensors respond to the accelerations of each test mass. Combining the output signals of the motion sensors leads to a more robust estimate of the actual acceleration values. As depicted, the first and second sensor sets 80, 81 are sensitive to radial motion; an additional test-mass-sensor system may be included in each cavity in alignment with the streamer axis if tri-axis sensitivity is needed.

Figure 15:
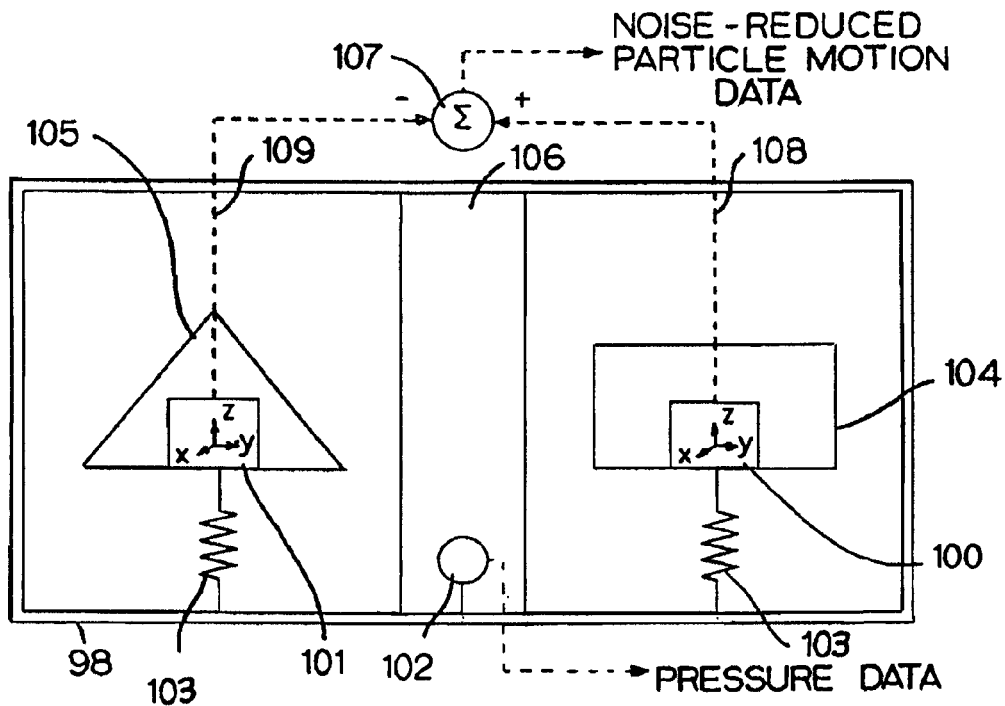
FIG. 15 is yet another version of a seismic system as in FIG. 7 in which each motion sensor has a different acoustic cross-section to provide different acoustic responses.

Yet another version of a seismic system is shown in FIG. 15. A streamer with a rigid, acoustically transparent exterior 98 has two motion sensors 100, 101, such as dc-sensitive, tri-axis accelerometers, and one pressure sensor 102, such as a hydrophone. The exterior 98 may comprise, for instance, a perforated, rigid housing covered with a flexible, acoustically transparent skin. The accelerometers can be realized by microelectromechanical system (MEMS), PZT, single crystal, or any other technology with similar utility. The motion sensors 100, 101 are rigidly mounted to first and second rigid housings 104, 105 to enable direct measurement of any dynamic streamer motion. Both sensors are coupled acoustically to the cable exterior 98, but are isolated acoustically from each other, for instance, by a central divider 106. Each of the first and second housings 104, 105 is constructed such that the mass of the first housing plus the mass it encloses equals the mass of the second housing plus the mass it encloses. The dynamic couplings 103 between the housings and the streamer exterior 98 are designed to act as second-order mass-spring systems with equal spring constants so that the equality of the mass-spring relationships is preserved. On the other hand, the housings have different acoustic cross-sections so that they generate different responses to acoustic pressure waves. Specifically, the first sensor 100 generates a first sensor signal 108 that is a good representation of the acoustic particle motion; the second sensor 101 produces a second sensor signal 109 that is largely insensitive to acoustic waves. The sensor housings are constructed with different geometries, and possibly also with different materials, to effect different cross-sections and, thus, different transfer functions for each sensor. The second sensor signal 109 is subtracted 107 from the first sensor signal 108 either locally or after remote processing, to provide the desired pressure wave signal with greatly attenuated response to streamer motion. Open-cell foam can be used, for example, to serve as the dynamic coupling 103 between each housing 104, 105 and the exterior 98. Filled with a fluid calibrated to match the acoustic impedance of the surrounding seawater, the foam can serve also as a transparent acoustic coupling. In this example, the first housing 104 is sealed with respect to the fluid and filled with air to account for any non-negligible elasticity in the housing; and the second housing 105 is perforated or slotted and allowed to fill with the surrounding fluid. The resultant disparity in overall density between the housings accounts for their different responses to incident pressure waves.

Figure 16:
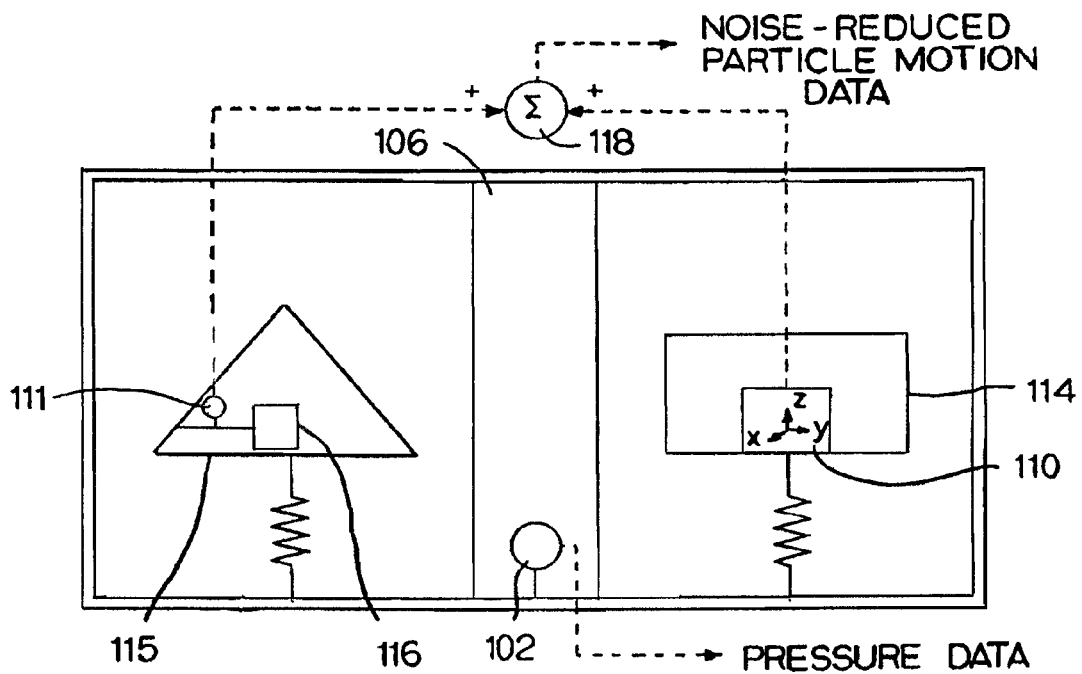
FIG. 16 is an alternative version of the seismic system of FIG. 15 with higher gain.

A modified version of the seismic system of FIG. 15 intended to enhance the overall gain of the system is shown in FIG. 16. The first sensor 110 behaves acoustically and dynamically like the first sensor 100 in FIG. 15. The second sensor 111 produces a response to pressure waves that matches that of the first sensor 110 and a streamer-motion response equal in magnitude but opposite in polarity to that of the first sensor. The first housing 114 and the second housing 115 are constructed as in FIG. 15, particularly in terms of acoustic cross-section and density, so that they have a similar mass-spring response to cable motion, but a measurably different response to incident acoustic pressure waves. The second housing 115 additionally includes a test mass 116 that is designed to oscillate in a fluid and have an acoustic wave response matching that of the first housing 114. On the other hand, the response of the test mass to streamer motion is much less than that of the housings because the test mass is suspended in a fluid and the housings are coupled mechanically to the cable exterior. The test mass 116 is connected non-rigidly to the second housing 115 by means of a displacement, motion, or acceleration sensor 111 that uses the second housing as a frame of reference. In this example, a cantilevered accelerometer, composed of piezoelectric materials, is used as the motion sensor. Multiple accelerometers can be employed to form a tri-axis sensor, with each test mass calibrated to match the acoustic response of the first housing 114 in its respective axis. Pressure waves, which impart motion on the test mass 116, but not on the second housing 115, are therefore detected positively, i.e., in phase. So pressure signals from the first sensor 110 and the second sensor 111 match in both magnitude and sign. Conversely, streamer vibrations, which influence the second housing 115, but not the test mass 116, are detected negatively, i.e., opposite in phase. So vibration signals from the sensors match in magnitude, but have opposite signs. In this case the signals from the two sensors 110, 111 are combined by addition 118, rather than subtraction, to produce a greatly diminished streamer-motion response and a simultaneous increase in gain of the acoustic wave response. Alternatively, another cantilevered test mass in the first housing 114 could be used. But, because the first sensor signal would also be reversed in polarity, it would have to be combined with the second sensor signal by subtraction rather than addition.

Figure 17:
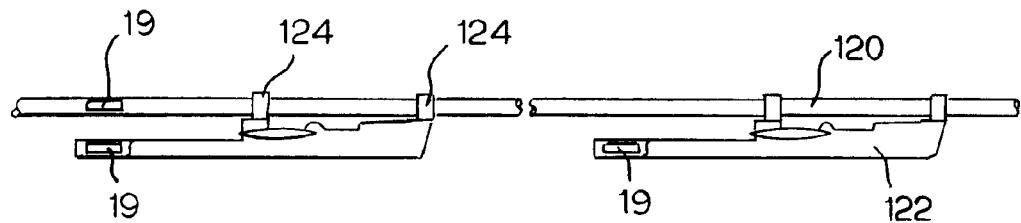
FIG. 17 is a side elevation view of a seismic system as in FIG. 7 mounted in cable-positioning birds rotatably suspended from a streamer.
Figure 18:
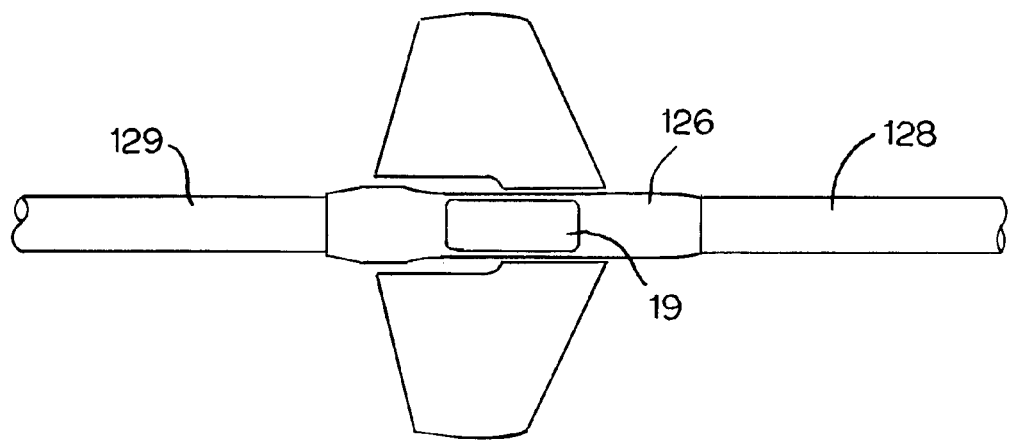
FIG. 18 is a side view of a seismic system as in FIG. 7 mounted in a cable-positioning bird connected in line between streamer sections.

As shown in FIG. 17, the sensor portion of the seismic system 19 can be mounted within a streamer cable 120 or within a cable-positioning device, such as a cable-leveling or cable-steering bird 122, rotatably attached to the streamer by collars 124. As shown in FIG. 18, a cable-positioning device 126 connected in line between fore and aft streamer sections 128, 129 can house the sensor portion of the seismic system 19. Clearly, the sensors can be mounted in other devices attachable in, on, or to a streamer, an ocean-bottom cable, or an autonomous node.

A tri-axis accelerometer with response to dc similar to the VectorSeis sensor manufactured by ION Geophysical Corporation of Houston, Tex., U.S.A., is suitable for many embodiments of the invention. Since there is no dc component to the seismic wavelet, the dc response of the motion sensor is used to detect the orientation of the sensor relative to gravity. One axis of the sensor is designed to be in the known orientation of the streamer axis. Since the streamer axis orientation is known and the gravity vector is measured, the orientation of the sensor, and thus the arriving sensed seismic wavelet, can be electronically rotated relative to gravity so that up-going seismic wavelets can be accepted and down-going seismic wavelets rejected.

Any sensors that detect motion can be used. The sensors can be any motion sensors responsive to position, velocity, or acceleration. For instance, a gimbaled first geophone, as described by Tenghamn et al. in U.S. Pat. No. 7,239,577, can be combined with a second geophone, packaged so that it has little or no response to an acoustic wave and the same response to streamer motion, to achieve the desired result. Piezoelectric accelerometers can be used, as long as they have adequate sensor performance.

If the sensor cannot determine its own orientation, separate orientation sensors can be included in the sensor systems. Alternatively, mechanical means—such as a gimbal system—can be used to fix the sensors in a known orientation. Winged devices attached to the streamer, sometimes referred to as birds, can also be used to force the sensor into a desired orientation.

The invention is not meant to be limited to use in towed marine streamers. The techniques described can also be used in other platforms, such as ocean-bottom cables and autonomous node systems. Additionally, the sensor systems described can be employed for the gathering of seismic data individually; or they can be strung together and used collectively, their data combining to reduce the impact of local flow patterns.

What is claimed is:

1. An underwater autonomous node comprising:
   a platform;
   a first region of the platform having a first acoustic impedance equal to that of seawater;
   a first motion sensor disposed in the first region and having a first test mass to produce a first response sensitive to seismic waves and platform motion;
   a second region of the platform separated from the first region and having a second acoustic impedance equal to that of air;
   a second motion sensor disposed in the second region and having a second test mass to produce a second response sensitive to platform motion and insensitive to seismic waves.

2. An autonomous node as in claim 1 wherein the first region contains seawater or a material having the acoustic impedance of seawater.

3. An autonomous node as in claim 1 further comprising a pressure sensor providing a pressure signal to be combined with the first response of the first motion sensor and the second response of the second motion sensor to remove multiples and ghosts.

4. An autonomous node as in claim 1 wherein the first and second responses are similar for motion of the underwater autonomous node.

5. An autonomous node as in claim 1 further comprising a divider disposed between the first and second motion sensors.

6. An autonomous node as in claim 1 wherein the first region is enclosed in a first rigid, perforated housing covered with an acoustically transparent skin and wherein the second region is enclosed in a second rigid housing.

7. An autonomous node as in claim 1 further comprising:
   a rigid body subject to motion of the autonomous node;
   a plurality of the first motion sensors coupled to the rigid body and a plurality of the second motion sensors coupled to the rigid body.

8. An autonomous node as in claim 7 wherein the rigid body has a tubular shape with an inner side and an outer side and wherein the plurality of first motion sensors are connected to the outer side and the plurality of second motion sensors are connected to the inner side.

9. An autonomous node as in claim 7:
   wherein the rigid body has a tubular shape dividing the seismic system into an external region receiving the first test mass and an internal region receiving the second test mass; and
   wherein the plurality of first motion sensors couples the first test mass to the rigid body and the plurality of second motion sensors couples the second test mass to the rigid body.

10. An autonomous node as in claim 7:
    wherein the first test mass encircles the rigid body;
    wherein the second test mass is encircled by the rigid body;
    wherein the plurality of first motion sensors couples the first test mass to the rigid body and the plurality of second motion sensors couples the second test mass to the rigid body.

11. An autonomous node as in claim 10 wherein the first test mass, the rigid body, and the second test mass are coaxially arranged.

12. An autonomous node as in claim 1 further comprising:
    a first rigid housing rigidly coupled to the first motion sensor;
    a second rigid housing rigidly coupled to the second motion sensor;
    a divider disposed between the first and second rigid housings to acoustically isolate the first and second motion sensors in the first and second regions from each other;
    wherein the first and second rigid housings have different acoustic cross sections to incident acoustic waves.

13. An autonomous node as in claim 1 further comprising:
    a first rigid housing rigidly coupled to the first motion sensor;
    a second rigid housing for the second motion sensor;
    wherein the second test mass is inside the second rigid housing and is non-rigidly coupled to the second rigid housing by the second motion sensor;
    wherein the first and second motion sensors respond in phase to acoustic waves and opposite in phase to platform motion.

14. An autonomous node as in claim 1 further comprising means for combining the first response and the second response to attenuate noise due to motion of the autonomous node and to produce a response due to seismic waves only.

15. An autonomous node as in claim 1 wherein the first motion sensor and the second motion sensor are accelerometers.

16. An underwater autonomous node comprising:
    a rigid body;
    a first region having a first acoustic impedance and a separate second region having a second acoustic impedance;
    wherein the first acoustic impedance is equal to the acoustic impedance of seawater and the second acoustic impedance is equal to the acoustic impedance of air;
    a first motion sensor coupled to the rigid body and having a first test mass disposed in the first region having the first acoustic impedance to produce a first sensor signal representing particle motion due to seismic waves and motion of the rigid body;
    a second motion sensor coupled to the rigid body and having a second test disposed in the second region having the second acoustic impedance to produce a second sensor signal representing attenuated particle motion due to seismic waves and motion of the rigid body;
    means for combining the first sensor signal and the second sensor signal to attenuate noise due to motion of the rigid body and produce a response to particle motion due to seismic waves.

17. An autonomous node as in claim 16 further comprising a pressure sensor providing a pressure signal to be combined with the response to particle motion due to seismic waves to remove multiples and ghosts.

18. An underwater autonomous node comprising:
    a platform;
    a first region of the platform having a first acoustic impedance and a separate second region of the platform having a second acoustic impedance;

wherein the first acoustic impedance is equal to the acoustic impedance of seawater and the second acoustic impedance is equal to the acoustic impedance of air;

a first motion sensor having a first test mass disposed in the first region having the first acoustic impedance to provide a first response sensitive to seismic waves and platform motion;

a second motion sensor having a second test mass disposed in the second region having the second acoustic impedance to provide a second response sensitive to platform motion and insensitive to seismic waves;

an acoustic shield arranged to shield the second motion sensor from particle motion due to seismic waves.

19. An autonomous node as in claim 18 further comprising a pressure sensor providing a pressure signal to be combined with the first response and the second response to remove multiples and ghosts.

\* \* \* \* \*